(12) United States Patent
Chen et al.

(10) Patent No.: US 6,339,640 B1
(45) Date of Patent: Jan. 15, 2002

(54) METHOD AND APPARATUS FOR AUTOMATIC CALLBACK IN A TELECOMMUNICATION SYSTEM

(75) Inventors: Julie J. Chen, Nepean; Dany Sylvain, Gatineau, both of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/215,260

(22) Filed: Dec. 18, 1998

(51) Int. Cl.[7] ............................................... H04M 3/42
(52) U.S. Cl. ............................ 379/209.01; 379/201.01; 379/207.02
(58) Field of Search .......... 379/209.01, 210.01–210.03, 379/211.01–211.05, 213.01, 215.01, 201.01–201.12, 207.01–207.16, 100.05, 100.06, 219, 221.08, 221.09, 221.1, 220.01

(56) References Cited

U.S. PATENT DOCUMENTS

| | | | | |
|---|---|---|---|---|
| 5,185,782 A | * | 2/1993 | Srinivasan | 379/214 |
| 5,406,616 A | * | 4/1995 | Bjorndahl | 455/433 |
| 5,425,091 A | * | 6/1995 | Josephs | 379/201 |
| 5,479,495 A | * | 12/1995 | Blumhardt | 379/207 |
| 5,661,790 A | * | 8/1997 | Hsu | 379/209 |
| 5,692,033 A | * | 11/1997 | Farris | 379/201 |
| 5,729,595 A | * | 3/1998 | Kugell et al. | 379/100.09 |
| 5,960,065 A | * | 9/1999 | Beck et al. | 379/93.07 |
| 5,995,848 A | * | 11/1999 | Nguyen | 455/528 |
| 6,009,157 A | * | 12/1999 | Bales et al. | 379/209.01 |
| 6,035,031 A | * | 3/2000 | Silverman | 379/209.01 |
| 6,154,644 A | * | 11/2000 | Marray | 455/414 |
| 6,173,054 B1 | * | 1/2001 | Beyda et al. | 379/386 |

* cited by examiner

Primary Examiner—Ahmad Matar
Assistant Examiner—Benny Q. Tieu

(57) ABSTRACT

A method and apparatus for automatic callback used in an Advanced Intelligent Network (AIN). The system is particularly useful in the Personal Computer (PC) environment for guaranteed use of the next available channel to one of the modems of an Internet Services Provider (ISP). This invention makes use of the existing Automatic Call Back (ACB) feature designed for voice calls, to PC modem dial-up calls. In a specific example, the apparatus, that can be in the form of an Service Control Point (SCP) keeps in a table entries of unsuccessful communication attempts between modems and a called party, such as an ISP, as a result of a busy line condition on the ISP side. When the busy line condition ceases, the SCP issues the necessary control signals in the network to cause the Service Switching Point servicing a modem to notify the modem to re-dial. When the modem goes off-hook, the SSP applies dial tone. The modem that is invited to re-try establishing a communication attempt is selected from the table in the SCP. A possible selection strategy is to look at the oldest entry.

17 Claims, 9 Drawing Sheets

METHOD AND APPARATUS FOR AUTOMATIC CALLBACK IN A TELECOMMUNICATION SYSTEM

FIELD OF THE INVENTION

The present invention relates to a method and apparatus for performing automatic callback. The invention can be implemented in an Advanced Intelligent Network (AIN) environment. The system is particularly useful in the management of dial-up connections between subscribers and an Internet Services Provider (ISP).

ACRONYMS USED IN THIS SPECIFICATION

ACB: Automatic Call Back;
(A)IN: (Advanced) Intelligent Network;
BCM: Basic Call Model
DN: Dialled Number;
DP: Detection Point;
DTMF: Dual-Tone Multifrequency;
EDP: Event Detection Point;
IP: Intelligent Peripheral;
ISP: Internet Services Provider;
PC: Personal Computer;
PIC: Point-in-Call;
SCP; Service Control Point;
SS7: Signalling System 7;
SSP: Service Switching Point;
TCAP: Transaction Capability Application Part;
TDP: Trigger Detection Point;

BACKGROUND OF THE INVENTION

Currently, when a user wants access to the Internet, he/she dials up, through the modem connected to the Personal Computer (PC), the ISP's telephone number for connection to one of the modems from its pool of modems. Sometimes, none of the ISP modems are available. In such cases, the user will receive an advisory message or a busy signal and, depending on his software setup, his modem will redial after a certain period of time until it successfully connects to the ISP.

A problem with this approach is that if one of the ISP's modems becomes available in between the successive dial-ups, someone else may obtain the line. The result is that the user waits unnecessarily to obtain a connection to his ISP. Furthermore, this method consumes network resources unnecessarily thereby incurring costs to the telephone operating company.

A possible solution is to adjust the software to reduce the time between dial-ups thereby increasing the likelihood of connecting to the first available modem. An obvious disadvantage of this method is that it keeps the line and network resources unnecessarily busy for long periods of time, especially if none of the ISP's modems become available for a while. This solution also incurs unnecessary costs to the telephone operating company. In addition, a high rate of re-dial may trigger a protection mechanism in the telephone network designed to limit the velocity of call attempts. In such situation, the telephone network may become non-responsive to call attempts.

Thus, there exists a need in the industry to provide a system to manage the utilisation of a pool of modems through which multiple users can establish dial-up connections.

SUMMARY OF THE INVENTION

In summary, the invention provides an apparatus for use in a telecommunication network to provide automatic callback (ACB) to a modem attempting to establish a data exchange session with a called party. The apparatus has an input to receive an input control signal from the telecommunication network signalling a busy line condition event at the called party. When the busy line condition ceases, as may be determined by another control signal received from the telecommunication network, the apparatus issues an output control signal directing the telecommunication network to notify the calling modem to re-try establishing the data exchange session with the called party.

In a specific example of the present invention the ACB feature is implemented on an SCP of the telecommunications network. The SCP is the AIN entity that provides database supported subscriber services.

Under this preferred embodiment of the invention, the telecommunications network notifies the SCP (typically the message originates from the SSP servicing the called modem) once a line to one of the ISP modems becomes available. The SCP will send a message to the network (typically the message is sent to the SSP serving the calling modem) to notify the calling modem that the line is now free. At the same time the SCP directs the SSP servicing the calling modem to observe the line condition. When the line goes off-hook, the SSP generates dial tone so the modem can re-dial More specifically, the procedure for dial tone generation includes the following steps The first step is the detection of the off-hook condition. This detection is performed by the SSP that observes the state of the telephone line of the calling party. When the off-hook condition is detected, the SSP issues a message to the SCP to advise the SCP of this event. The SCP sends dial tone establishment instructions to the SSP. The calling modem then dials the digits and waits for the carrier.

The SCP may be provided with a database to store entries related to unsuccessful communication attempts. Each entry includes a time stamp allowing to age the entry. When the line becomes free, the SCP searches the database and notifies the calling party that corresponds to the oldest entry, i.e., the person that has been waiting the longest. Other possible selection strategies may also be considered and age is only one of them.

DESCRIPTION OF A PREFERRED EMBODIMENT

Figure 1:
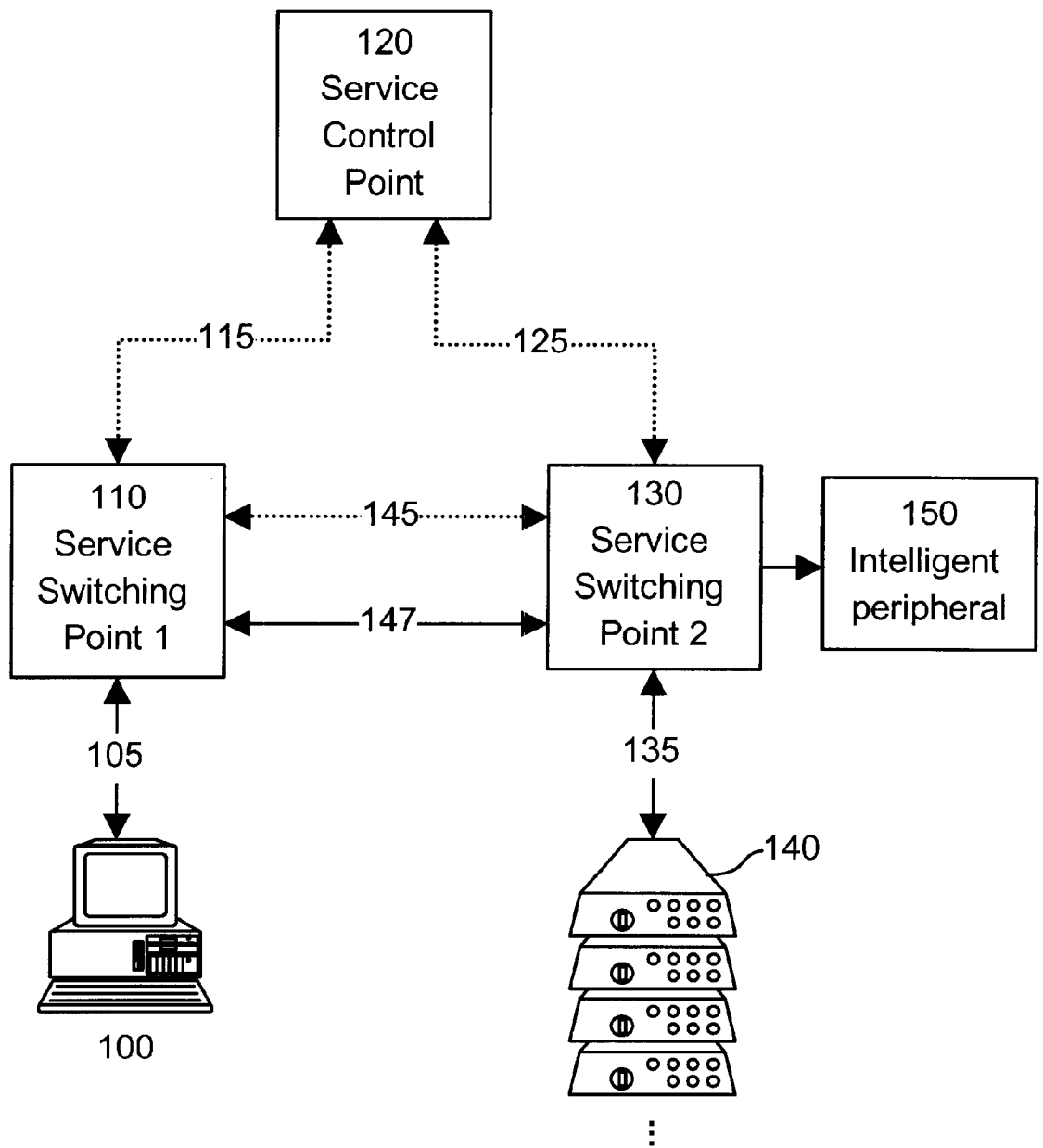
FIG. 1 is a partial view of an Advanced Intelligent Network which incorporates the invention.

FIG. 1 is a simplified view of an AIN in accordance with an embodiment of the invention The components shown include a PC 100, two SSPs 110 and 130, an SCP 120, a pool of modems 140, an Intelligent Peripheral (IP) 150, voice/ data communication lines 105, 135 and 147, and signaling network lines 115, 125 and 145.

The PC 100 provides the interface to the user who wishes to communicate with the pool of modems 140. The PC 100 therefore includes a modem and the necessary software to establish a communication with another modem This pool of modems could be used by an Internet Service Provider (ISP) for providing access to the Internet to its subscribers.

The service switching points (SSP) 110 and 130 act as voice and signaling switches. The SSPs 110 and 130 are identical for the purpose of this disclosure.

The voice function of the SSP switches voice/data to/from users, such as PC 100, to/from other SSPs or other users. To accomplish this, SSP 110 is connected to users such as PC 100 through a voice/data link 105, and to other service switching points such as SSP 130 through voice/data link 147.

The signaling function of the SSP converts signaling from the users to, for example, SS7 signaling messages, which can then be sent to other exchanges through the SS7 network. Conversely, the SSP provides the reverse transformation. The SSP uses the information provided by the calling party (such as dialed digits) and determines how to connect the call. A routing table identifies which trunk circuit to use to connect the call, and at which exchange this trunk terminates. A signaling message is sent to the adjacent exchange requesting a circuit connection on the specified trunk The distant exchange grants permission to connect this trunk by sending back an acknowledgment to the originating exchange. Using the called party information in the setup message, the distant exchange can determine how to connect the call to its final destination. This may require several trunk connections between several exchanges. The SSP signaling function manages these connections until the final destination is reached.

For the signaling function, the SSP 110 is connected to other service switching points, such as SSP 130, and to service control points, such as SCP 120, via signaling links 115, 145 and 125. The signaling links 115, 145 and 125 normally use the Signaling System 7 (SS7) protocol.

The service control point 120 responds to query messages sent by an SSP and serves as an interface to telephone company databases. Thus, SCPs are often described with databases incorporated. These databases are used to store information about subscribers' services, routing of special service numbers (such as 800 and 900 numbers), calling card validation and fraud protection, and even Advanced Intelligent Network (AIN) services used when creating a service for a subscriber. SCP 120 is a computer used as a front end to the database system. The address of SCP 120 is a point code, while the address of the database is a subsystem number.

The last component of FIG. 1 is the Intelligent Peripheral (IP) 150. The IP provides resource management of devices such as voice response units, voice announcers and Dual-Tone MultiFrequency (DTMF) sensors for caller-activated services. The IP is accessed by the SCP 120 either directly or, as shown in FIG. 1, via SSP2 130. IPs are used by the AIN to interact with customers. IPs may therefore be used to allow customers to define their network needs themselves, without the use of telephone operating company personnel.

Figure 2:
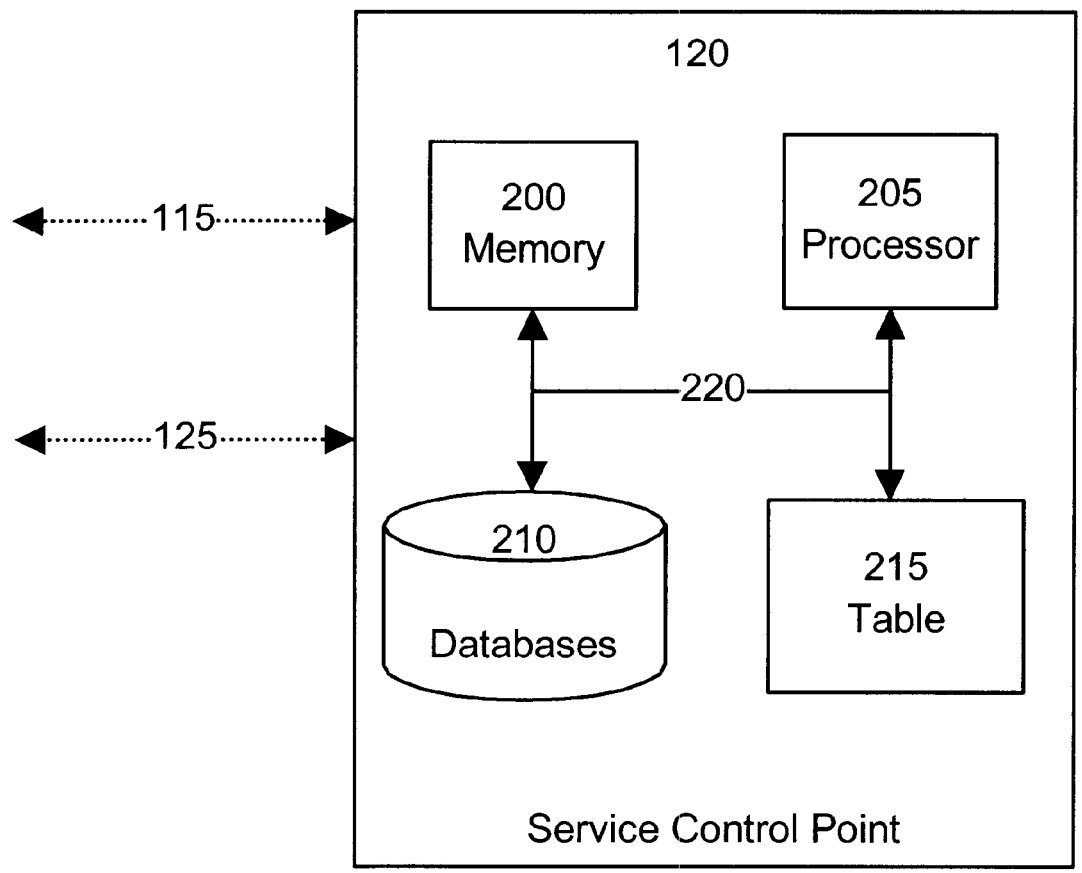
FIG. 2 is a block diagram showing the Service Control Point in accordance with an embodiment of the invention.

FIG. 2 is a block diagram showing a Service Control Point 120 in accordance with an embodiment of the invention. SCP 120 receives/sends signaling instructions on lines 115 and 125. SCP 120 has four main components: a processor 205, a memory 200, databases 210, and tables 215. The memory 200 is used for storing instructions for the operation of processor 205, for storing the data used by processor 205 in executing those instructions, and for buffering incoming and outgoing data. A bus 220 is provided for the exchange of information between all components of SCP 120. The instructions stored in the processor 205 for achieving the results of the invention are detailed in the method described in FIG. 4.

The databases 210 are shown as part of SCP 120, but these are usually external components. As stated earlier, they hold information necessary for services offered by the AIN. When information concerning subscriber's is required, processor 205 gets it from databases 210 before proceeding. The format of the information may differ with each service.

The channel reservation table 215 records information related to the identification of the calling and called parties as well as the time of an unsuccessful communication attempt. The table below illustrates a type of format that may be used. Its length is not specified here and it is limited only by the channel reservation 215 memory capacity. In an embodiment of the invention, the timer is set to 30 minutes.

| Entry | Calling ID | Called ID | Timer (minutes) |
|-------|-----------|-----------|-----------------|
| 1 | 555-1122 | 285-1236 | 28:45 |
| 2 | 987-6542 | 466-1487 | 29:02 |
| 3 | 654-8437 | 761-7611 | 29:30 |
| ... | ... | ... | ... |

The table above shows that entry 3 is the most recent (i.e., it has been in the table for 30 seconds) while entry 1 is the oldest (i.e., it has been in the table for 75 seconds) Therefore, when the processor 205 needs to identify, from this short list, the oldest entry as the next entry to access the ISP modems, entry 1 will be chosen.

Figure 3:
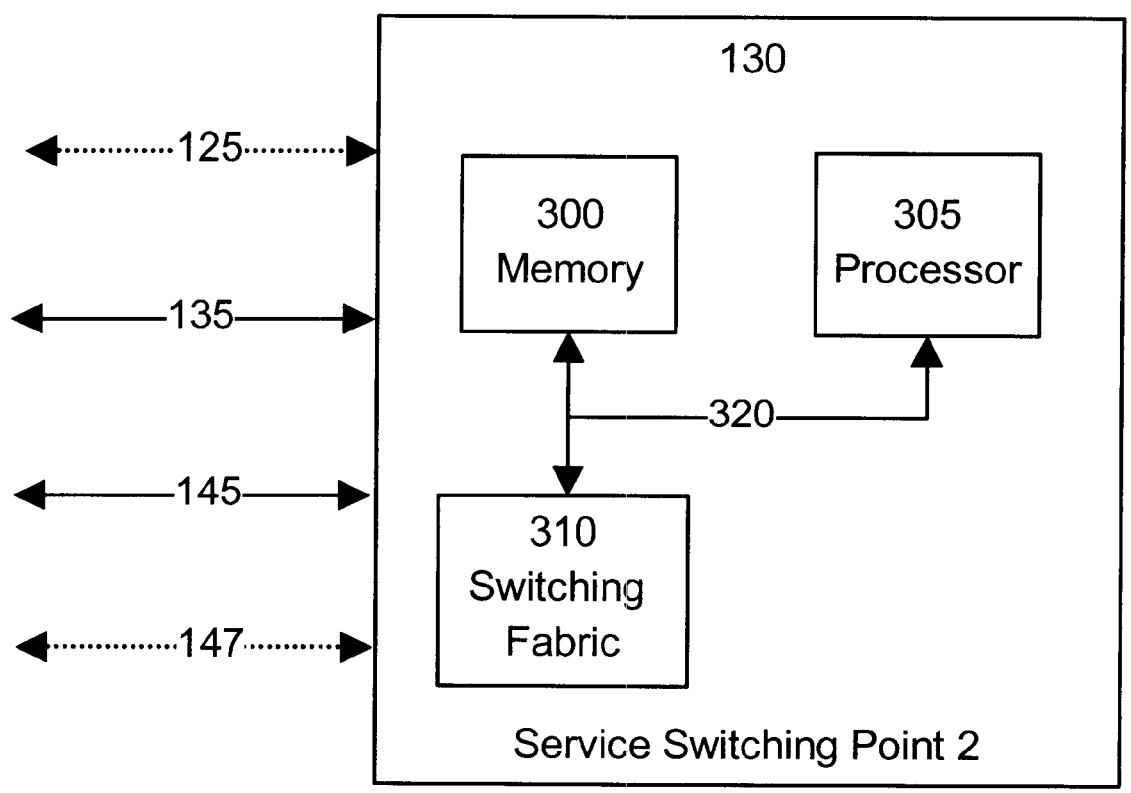
FIG. 3 is a block diagram showing the Service Switching Point in accordance with an embodiment of the invention.
Figure 4A:
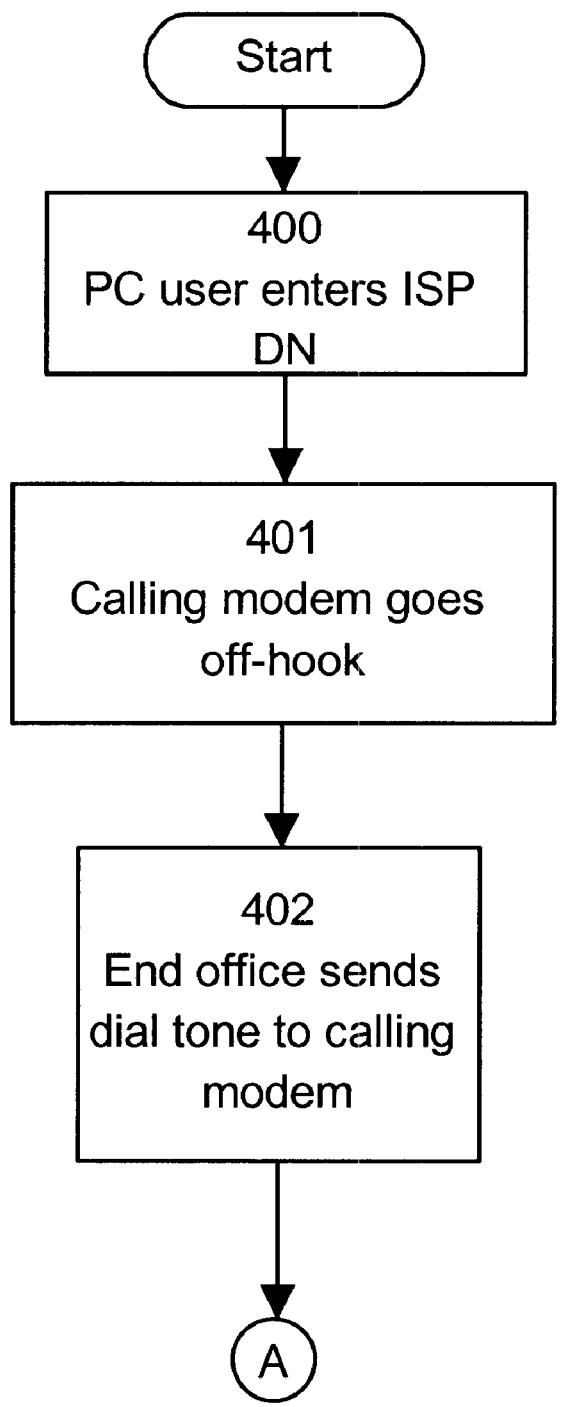
FIG. 4 is a flowchart describing an embodiment of the method for performing automatic callback, in accordance with the present invention.
Figure 4B:
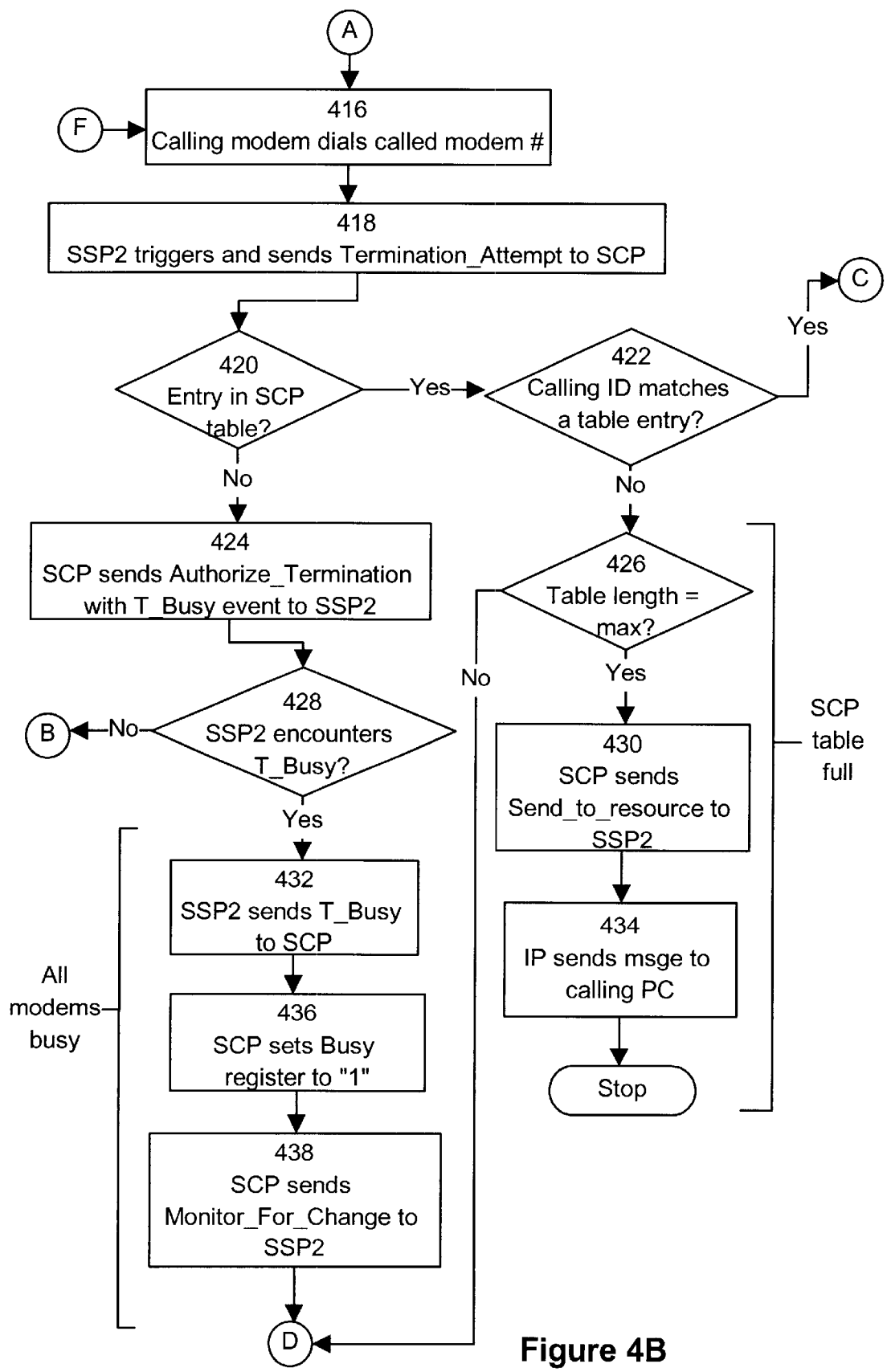
Figure 4C:
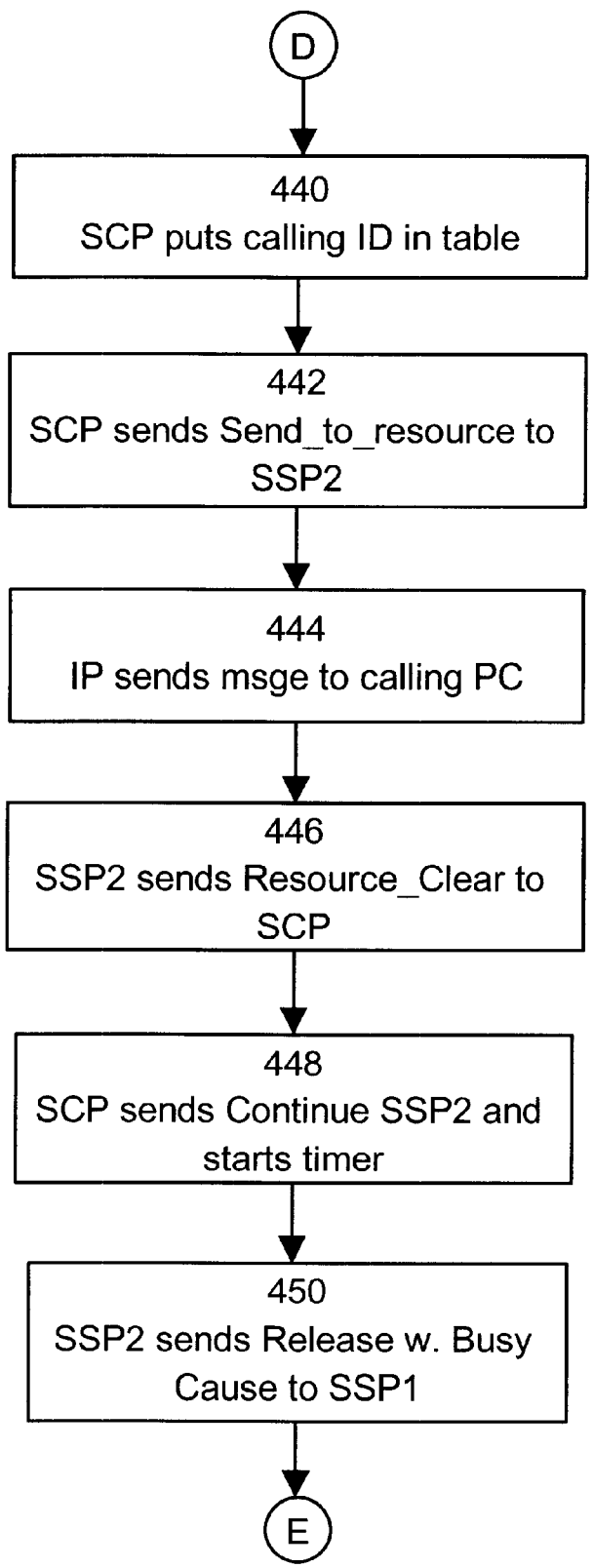
Figure 4D:
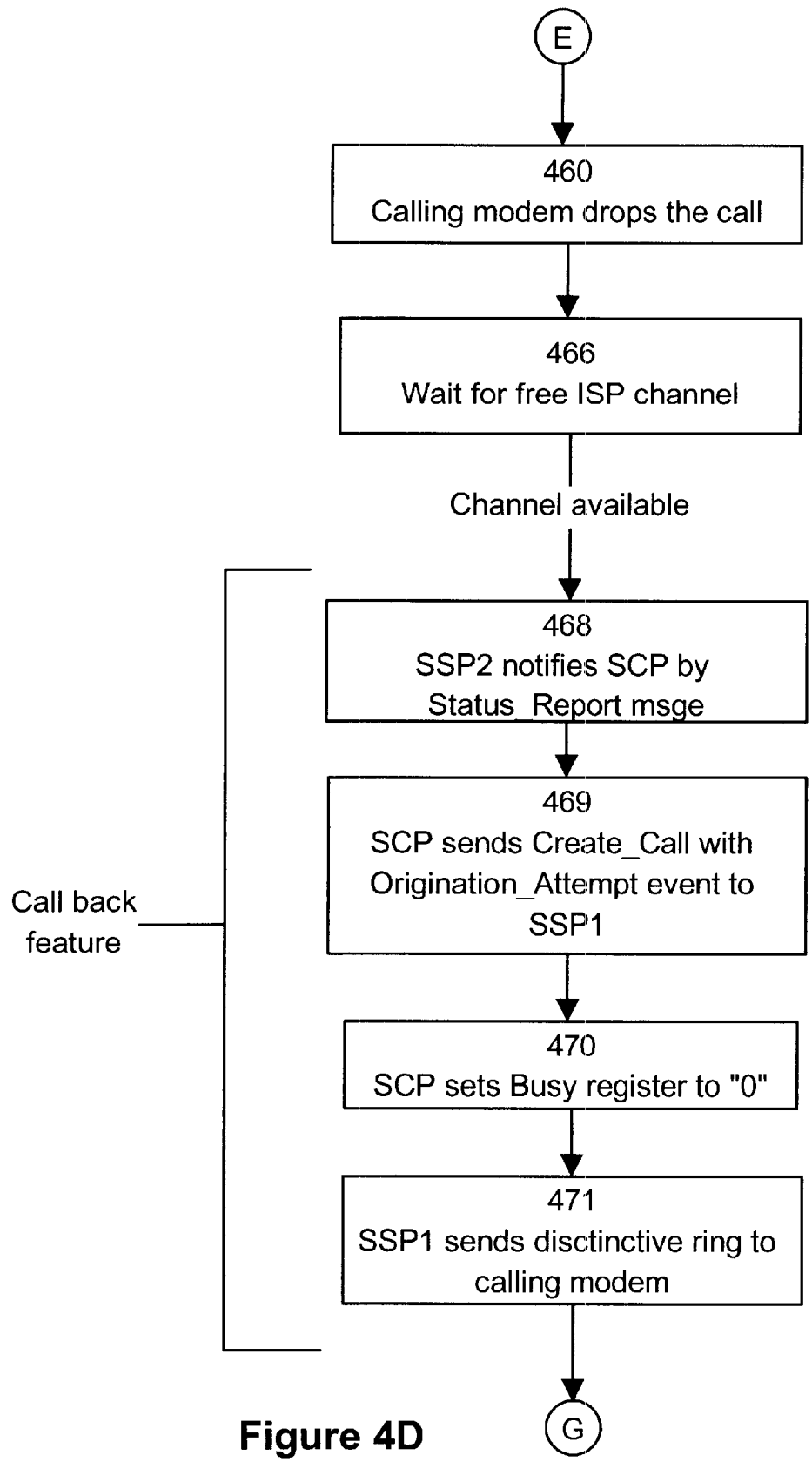
Figure 4E:
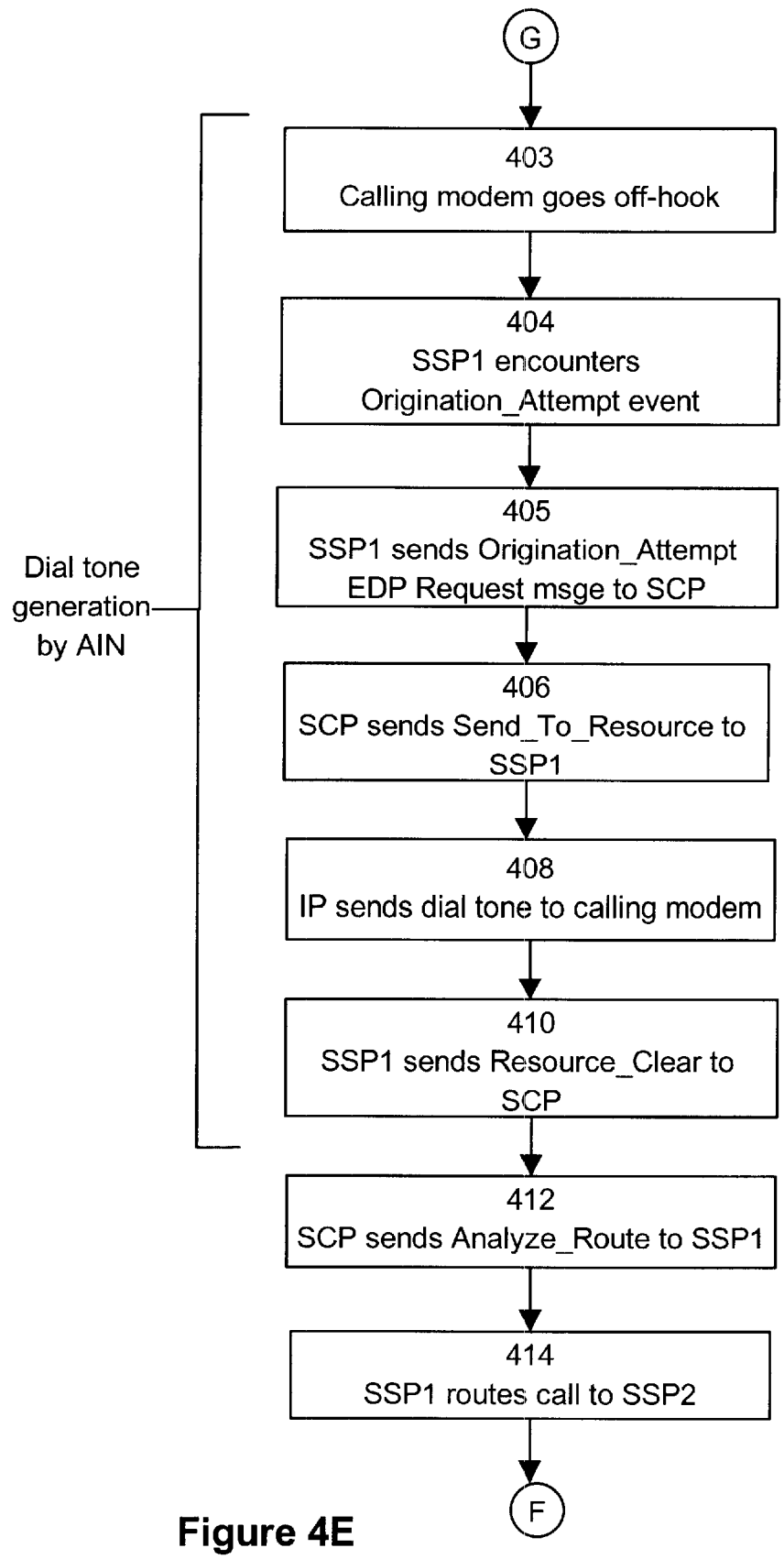
Figure 4F:
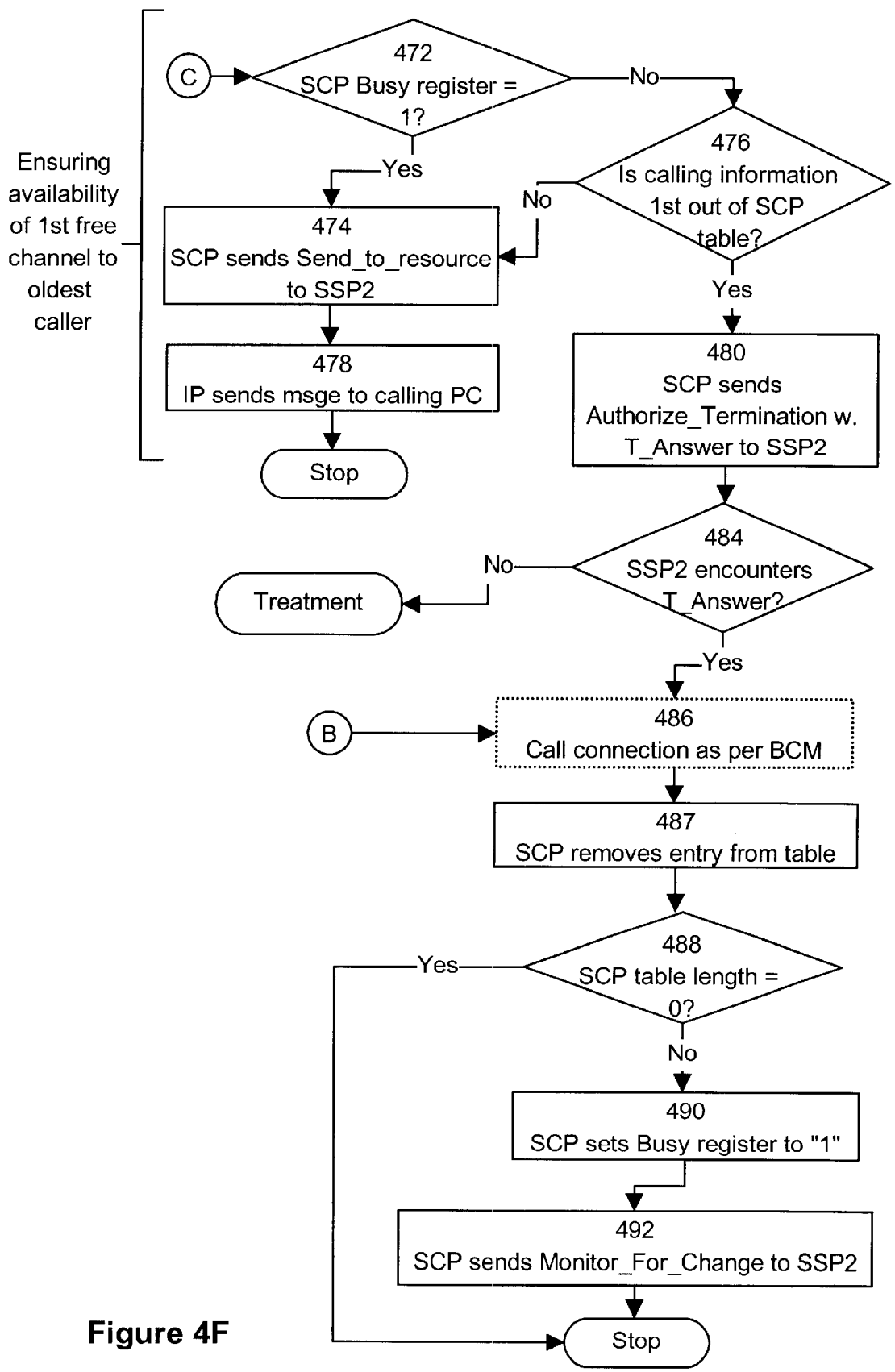

FIG. 3 is a block diagram showing Service switching Point 130 in accordance with an embodiment of the invention. SSP 130 receives/sends voice/data on lines 135 and 147, and signaling on lines 125 and 145. SSP 130 has three main components: a processor 305, a memory 300, and switching fabric 310. The memory 300 is used for storing instructions for the operation of processor 305, for storing the data used by processor 305 in executing those instructions, and for buffering incoming and outgoing data. The instructions stored in the processor 305 for achieving the result of the invention are detailed in the method described in FIG. 4.

The switching fabric 310 handles the actual connection of calls to their destinations. The operation of the switch matrix is controlled by the processor 305 that communicates with the switch matrix 310 through a data bus 320. The processor 305 receives data over bus 320 relative to the status of call sessions so decisions on the handling of call sessions can be made by the processor 305. The latter also uses the data bus 320 to transmit commands to the switch matrix 310 to manage call sessions, such as establishing the connection between two or more destinations, terminating the connection, etc.

The primary function of the SSP 130 in the telephone network is to establish connections between telephone instruments and data equipment for the transmission of voice and data. When a local call is placed, the following fundamental switch call processing steps come into play: call detection, dial tone provision, digit collection, digit translation, call routing, call connection, audible ringing/ringback, speech path establishment and, finally, call termination.

FIG. 4 is a flowchart describing an embodiment of the method for performing automatic callback, in accordance with the present invention. Assume for the purpose of this example, that there is at least one free modem in the pool of modems 140, and that the channel reservation table 215 is empty The PC user initiates a call (step 400) to the telephone number of an ISP by entering the numbers on his keypad. At step 401, the calling modem goes off-hook and at step 402, the end office (not shown) sends a dial tone to the calling modem. The end office is not shown in FIG. 1, but the tasks of the end office may be assumed by SSP1 110 since an SSP is an enhanced end office.

At step 416, the calling modem (of PC 100) dials the called modem number (modem pool 140). At step 418, SSP2 130 meets the Termination_Attempt trigger criteria and sends a Termination_Attempt message to SCP 120 to complete the call. At step 420, SCP 120 verifies its table 215 for an entry regarding a previous attempt by any caller to reach the pool of modems 140. If the table is empty (in this case it is according to the assumption above), the SCP proceeds, at step 424, to send an Authorize_Termination message with a T_Busy event to SSP2 130. The T_Busy event is required in order that SSP2 130 may check if the called party is busy.

At step 428, a check is performed at SSP2 130 for a T_Busy event. If there is no T_event, the call connection proceeds as per the BCM at step 486. The modems are then connected and start the handshaking procedure to exchange data SCP 120 concurrently removes the last entry from the table (step 487) and verifies its table length (step 488). According to our assumption, the length is zero and the procedure is terminated.

Assume now that none of the modems in the pool of modems 140 are free and that the channel reservation table 215 is empty. Therefore, when at step 428 SSP2 130 verifies the state of the line(s) leading to the pool of modems, it observes that none of the lines are available and generates a T_Busy message. The SSP2 130 then sends a T_message to SCP 120 (step 432). At step 436, SCP 120 sets its Busy register to "1" and, at step 438, it sends a Monitor_For_Change message to SSP2 130. SCP 120 then registers the call information in table 215 (step 440). As stated earlier the call information in table 215 may include the calling number, the called number, and timer information.

At step 442, SCP 120 sends a Send_To_Resource message to IP 150. The Send_To_Resource message contains specific information that instructs IP 150 to send a voice message to the calling PC 100 (step 444). In this case, the voice message could be: "The number you dialed is busy. You will be notified with a distinctive ring when it becomes available. Please dial again when you receive the distinctive ring."

At step 446, SSP2 130 sends a Resource_Clear message to SCP 120. SCP 120 responds, at step 448 with a Continue message and starts its timer for the last input in its table 215. The Resource_Clear message is required after a Send_to_Resource message. When the SCP 120 sends a Send_to_Resource message to an SSP, the SSP needs to set up a temporary connection to the resource. After the resource fulfills its function (e.g., play an announcement, collect digits, etc.), the SSP needs to cancel the temporary connection with the resource. The Resource_Clear message tells the SCP that the function was performed and that the result is reported (if required, i.e., for collected digits). The Resource_Clear message also cuts-off the temporary connection to the resource. After an announcement is played, the SCP has to give instructions to the SSP concerning the disposition of the call. The Continue message is used to tell the SSP that there is no change in the conditions from the SCP and to continue processing the call with these conditions.

At step 450, SSP2 130 sends a Release message with BusyCause parameter to SSP1 110 to release the communication line reserved for the call. Consequently, PC 100 will drop the call at step 460.

At this point, there is a waiting period (step 466) until a ISP channel becomes available. The next few steps describe the call back feature implemented by using AIN functions only vs. the ACB feature residing on an SSP. Once an ISP channel becomes available, SSP2 130 notifies SCP by sending a Status_Report message indicating that the line is idle (step 468). SCP then sends, at step 469, a Create_Call message with Origination_Attempt event to SSP1. At step 470, SCP sets its Busy register to "0" indicating that there is a free channel. At step 471, SSP1 110 sends a distinctive ring to the calling modem of PC 100.

The next few steps are for the generation of a dial tone by the AIN instead of by the end office switch as is done normally. The user, recognizing this distinctive ring, will go off-hook with his PC's modem (step 403 ) At off-hook detection SSP1 110 encounters the Origination _Attempt event (step 404 ) and sends an Origination_Attempt EDP request message to SCP 120 (step 405 )

At step 406 SCP 120 sends a Send_To_Resource message to SSP1 110. This last message gives the instructions to SSP1 110 to send a dial tone to the calling modem (PC 100 ) (step 408). At step 410, SSP1 110 sends a Resource_Clear message to SCP 120. SCP 120 responds to SSP1 110 with an Analyze_Route message at step 412. At step 414, SSP1 110 reserves a route for the call to SSP2 130.

The procedure returns to step 416 where the calling modem will effectively dial the ISP's DN. When the procedure reaches step 420 to verify if there is an entry in the SCP 120 table 215, the answer will be "Yes" and it will proceed to step 422. At step 422, a verification is made to see if the call information matches a table entry. In this case it should since the call information was previously input at step 440

Before proceeding to authorize the connection of the call, a process is in place to verify if this is a caller who is calling back before he receives a distinctive ring. The SCP 120 therefore check its Busy register (step 472). If the register is at "1", this signifies that none of the ISP modems are available and the procedure proceeds to step 474. At step 474, SCP 120 then sends a Send To_Resource message to IP 150. The Send_To_Resource message contains specific information that instructs IP 150 to send a voice message to the calling PC 100 (step 478). In this case, the voice message could be: "The number you dialed is busy. We appreciate your patience. Please dial again when you receive the distinctive ring Thank you."

It at step 472, the verification revealed that the Busy register was not at "1", a second verification is performed at step 476. At step 476, SCP 120 checks the calling information against the information for the first out of table 215. If there is no match, the procedure goes to step 474 and proceeds to send a message to the caller as described above. An impatient caller who tries to jump the line is therefore blocked.

If, on the other hand, there is a match at step 476, SCP 120 sends an Authorize_Termination message with T_Answer event to SSP2 130 (step 480). When one of the modems in the pool 140 finally answers, SSP2 encounters, at step 484, a T_Answer and the call connection proceeds as per the BCM (step 486). The modems are then connected and start the handshaking procedure to exchange data. If a T_Answer is not encountered at step 484, treatment is required. Treatment could be a verification of the malfunction. For example, it could be a faulty message or a faulty transmission.

At step 487, SCP 120 then removes the oldest entry from table 215. After or during the call connection, SCP 120 checks its table 215 length (step 488). If it is equal to "0", the procedure ends. When the length of table 215 is not equal to "0", SCP 120 sets its Busy register to "1" (step 490 ) and sends a Monitor_For_Change message to SSP2 130 (step 492). The procedure is then complete.

Now, changing the initial conditions to assuming that this is the user's first attempt at reaching his ISP, and that there are some entries in the ACB queue in table 215 (i.e. all modems in the pool 140 are busy and at least one caller is waiting in the ACB queue), when the procedure reaches step 420 to verify if there is an entry in the SCP 120 table 215, the answer will be "Yes" and it will proceed to step 422. There will be no match between the call information and a table entry since these are our initial conditions (step 422). The SCP 120 then verifies, at step 426, if table 215 has reached its maximum length. If it has, SCP 120 sends a Send_To_Resource message to IP 150 (step 430). Then, IP 150 sends an appropriate message to the calling PC 100 (step 434). The message could be in the following form: "We are sorry We are now having extremely high volume of calls Please try again later. Thank you."

If at step 426, it was determined that the table had not reached its maximum length, then sCP 120 inserts call information in table 215. The procedure then proceeds to the remaining steps as described earlier and eventually returns to step 422 for comparison of the call information to the table 215 entries. This time it should match since the call information was previously input at step 440. SCP 120 then continues to step 472 and eventually the modems are connected and start the handshaking procedure to exchange data as described earlier.

The above description of a preferred embodiment of the present invention should not be read in a limitative manner as refinements and variations are possible without departing from the spirit of the invention. The scope of the invention is defined in the appended claims and their equivalents.

We claim:

1. A service providing apparatus for use in a telecommunication network for automatic callback to a modem attempting to establish a data exchange session with a called party, said apparatus comprising:
   a. an input for receiving an input control signal from the telecommunication network indicative of an unsuccessful attempt of the modem to establish a data exchange session with the called party as a result of a busy line condition at the called party;
   b. a processing functional block responsive to detection of the input control signal at said input for causing generation of an output control signal when the busy line condition at the called party ceases, the output control signal being characterized by a data content to prompt the telecommunication network to notify the calling modem to re-try establishing a data exchange session with the called party.

2. An apparatus as defined in claim 1, including a data structure holding a plurality of entries, each entry containing data identifying a modem that has failed to establish a data exchange session with the called party as a result of a busy line condition at the called party, said processing functional block capable of selecting one of said entries when the busy line condition ceases and causing generation of the output control signal that is characterized by a data content to prompt the telecommunication network to notify the calling modem identified by the selected entry to re-try establishing a data exchange session with the called party.

3. An apparatus as defined in claim 2, wherein the selected entry is the oldest one of the entries in said data structure.

4. An apparatus as defined in claim 3, wherein said apparatus is a service control point of an advanced intelligent network.

5. An apparatus as defined in claim 2, wherein each entry in said data structure includes data elements indicative respectively of:
   a. a calling party number;
   b. a called party number; and
   c. a time at which the entry has been made.

6. An apparatus as defined in claim 1, wherein the output control signal is further characterized by a data content to prompt the telecommunication network to generate dial tone on a line connecting the calling modem to the telecommunication network after the calling modem has been notified by the telecommunication network to re-try establishing a data exchange session with the called party.

7. A method for automatic callback to a modem attempting to establish a data exchange session with a called party in a telecommunication network, said method comprising:
   a. detecting an unsuccessful attempt to establish a communication session between the modem and the called party as a result of a busy line condition at the called party;
   b. notifying the modem when the busy line condition ceases to re-try establishing a communication session with the called party.

8. A method as defined in claim 7, wherein said method includes the step of observing a state of a line connecting the modem to the telecommunication network, and upon occurrence of an off-hook condition following the notification defined in step b of claim 7, generating dial tone on the line.

9. A method as defined in claim 7, wherein said method includes the step of storing in a data structure on a computer readable storage medium entries associated with respective failed attempts from modems to communicate with the called party as a result of a busy line condition at the called party.

10. A method as defined in claim 9, wherein said method further includes the step of processing said data structure to select an entry and notifying the modem associated with the selected entry when the busy line condition ceases to re-try establishing a communication session with the called party.

11. A method as defined in claim 10, wherein the selected entry is the oldest entry in said data structure.

12. A system in a telecommunication network for automatic callback to a modem attempting to establish a data exchange session with a called party, said system comprising:
   a. a first functional unit for detecting an unsuccessful attempt to establish a communication session between the modem and the called party as a result of a busy line condition at the called party;
   b. a second functional unit for notifying the modem when the busy line condition at the called party ceases to re-try establishing a communication session with the called party.

13. A system as defined in claim 12, wherein said second functional unit is operative to observe a state of a line connecting the modem to the telecommunication network and, upon occurrence of an off-hook condition after notifying the modem to retry establishing a communication session with the called party, generating dial tone on the line.

14. A system as defined in claim 12, wherein said system includes a data structure stored on a computer readable storage medium, said data structure including a plurality of entries associated with respective failed attempts from modems to communicate with the called party as a result of a busy line condition at the called party.

15. A system as defined in claim 14, wherein said second functional unit is operative to process said data structure to select an entry and notify the modem associated with the selected entry when the busy line condition ceases to re-try establishing a communication session with the called party.

16. A system as defined in claim 15, wherein the selected entry is the oldest entry in said data structure.

17. A service providing apparatus for use in a telecommunication network for automatic callback to a modem attempting to establish a data exchange session with a called party, said apparatus comprising:
   a. input means for receiving an input control signal from the telecommunication network indicative of an unsuccessful attempt of the modem to establish a data exchange session with the called party as a result of a busy line condition at the called party;
   b. processing means responsive to detection of the input control signal at said input means for causing generation of an output control signal when the busy line condition at the called party ceases, the output control signal being characterized by a data content to prompt the telecommunication network to notify the calling modem to re-try establishing a data exchange session with the called party.

* * * * *